(12) United States Patent
Li

(10) Patent No.: US 11,579,986 B2
(45) Date of Patent: Feb. 14, 2023

(54) DATA QUERY METHOD AND APPARATUS

(71) Applicant: HUAWEI CLOUD COMPUTING TECHNOLOGIES CO., LTD., Guizhou (CN)

(72) Inventor: Peng Li, Shenzhen (CN)

(73) Assignee: HUAWEI CLOUD COMPUTING TECHNOLOGIES CO., LTD., Gui'an New District (CN)

( * ) Notice: Subject to any disclaimer, the term of this patent is extended or adjusted under 35 U.S.C. 154(b) by 0 days.

(21) Appl. No.: 17/164,981

(22) Filed: Feb. 2, 2021

(65) Prior Publication Data

US 2021/0157685 A1    May 27, 2021

Related U.S. Application Data

(63) Continuation of application No. PCT/CN2019/095103, filed on Jul. 8, 2019.

(30) Foreign Application Priority Data

Aug. 3, 2018  (CN) .......................... 201810879580.4

(51) Int. Cl.
*G06F 7/00* (2006.01)
*G06F 17/00* (2019.01)
*G06F 11/14* (2006.01)
*G06F 16/23* (2019.01)
*G06F 16/2458* (2019.01)

(52) U.S. Cl.
CPC ...... *G06F 11/1469* (2013.01); *G06F 16/2379* (2019.01); *G06F 16/2477* (2019.01); *G06F 2201/84* (2013.01)

(58) Field of Classification Search
None
See application file for complete search history.

(56) References Cited

U.S. PATENT DOCUMENTS 7,206,961 B1 * 4/2007 Mutalik .............. G06F 11/1469
714/E11.122
2006/0047895 A1    3/2006 Rowan et al.
(Continued)

FOREIGN PATENT DOCUMENTS

CN    1740981 A    3/2006
CN    101777016 A    7/2010
(Continued)

OTHER PUBLICATIONS

Extended European Search Report issued in EP 19845149.4, dated Aug. 3, 2021, 9 pages.
(Continued)

*Primary Examiner* — Tuan A Pham

(57) ABSTRACT

This disclosure provides a data query method and apparatus. The method includes: dividing an object storage system into a plurality of storage spaces based on time slices, establishing a mapping relationship between the storage spaces, the time slices, and operation records, recording time slice information corresponding to a snapshot after generating the snapshot, and implementing services such as a read-only service, a snapshot rollback service, and an object change service based on the snapshot, so as to improve query performance without adding extra storage overheads.

17 Claims, 4 Drawing Sheets

(56) References Cited

U.S. PATENT DOCUMENTS

| | | | | |
|---|---|---|---|---|
| 2014/0089265 | A1* | 3/2014 | Talagala | G06F 16/22 707/674 |
| 2015/0193315 | A1* | 7/2015 | Cheong | G06F 11/1466 714/15 |
| 2018/0046553 | A1* | 2/2018 | Okamoto | G06F 16/164 |
| 2018/0157434 | A1 | 6/2018 | Aron et al. | |

FOREIGN PATENT DOCUMENTS

| | | | |
|---|---|---|---|
| CN | 102084330 | A | 6/2011 |
| CN | 102541750 | A | 7/2012 |
| CN | 102843396 | A | 12/2012 |
| CN | 103677834 | A | 3/2014 |
| CN | 103678039 | A | 3/2014 |
| CN | 104657362 | A | 5/2015 |
| CN | 105677687 | A | 6/2016 |
| CN | 106897168 | A | 6/2017 |
| CN | 107203331 | A | 9/2017 |
| CN | 107426605 | A | 12/2017 |
| CN | 109144416 | A | 1/2019 |

OTHER PUBLICATIONS

International Search Report and Written Opinion dated Sep. 19, 2019, issued in CN Application No. PCT/CN2019/095103, total 11 pages.

Search Report dated Jul. 18, 2019, issued in CN Application No. 2018108795804, total 3 pages.

Office Action dated Jul. 29, 2019, issued in CN Application No. 201810879580.4, total 3 pages.

* cited by examiner

DATA QUERY METHOD AND APPARATUS

CROSS-REFERENCE TO RELATED APPLICATIONS

This application is a continuation of International Application No. PCT/CN2019/095103, filed on Jul. 8, 2019, which claims priority to Chinese Patent Application No. 201810879580.4, filed on Aug. 3, 2018. The disclosures of the aforementioned applications are hereby incorporated by reference in their entireties.

TECHNICAL FIELD

This disclosure relates to the storage field, and more specifically, to a data query method and apparatus.

BACKGROUND

A snapshot is a mirror of a given data set at a specific moment, and is also referred to as an instant copy. The snapshot is a complete available copy of the data set. The Storage Networking Industry Association (SNIA) defines a snapshot as a fully usable copy of a specified data set, where the copy includes an image of corresponding data at a given time point. A snapshot may be a copy or a duplicate of data represented by the snapshot.

An existing snapshot includes two types of snapshots: a full snapshot and an incremental snapshot that use different snapshot technologies. The full snapshot uses a split mirror snapshot technology to create and maintain a complete mirrored volume for a source data volume before a preset snapshot time point is reached. Each time when data is written, the data is written to both the source data volume and the mirrored volume, and this occupies a large number of storage spaces. The incremental snapshot can track changes in the data volume and a snapshot volume. When a new incremental snapshot is generated, old snapshot data is refreshed.

All the foregoing listed snapshot technologies are for objects, for example, snapshot technologies for blocks and files. Currently, there is no snapshot technology for an object storage system, for example, a container-bucket snapshot technology for objects. In addition, for a massive data storage system, for example, a storage system with abundant storage spaces such as cloud storage, there is no snapshot technology that can enable users to have read-only access to content of an object storage system without affecting service performance of the storage system.

SUMMARY

This disclosure provides a data query method and apparatus, to provide a bucket-level snapshot method, so as to allow access to all object contents of a given snapshot without affecting service performance.

According to a first aspect, a data query method is provided, including: generating a mapping relationship, where the mapping relationship is used to indicate a one-to-one correspondence between N operations and N storage spaces that are corresponding to a first storage (also referred as "an object storage system"), where the N operations occur at different moments, and a first storage space in the N storage spaces is used to store a first storage object on which processing based on a first operation has been performed, where the first operation is corresponding to the first storage space, and the first storage space is any one of the N storage spaces; generating an operation record, where the operation record is used to record the occurrence moments of the N operations; receiving a first query request, where the first query request is used to request to query a storage status of the first storage object at a first moment; determining, from the N operations based on the operation record, the first operation before the first moment; and determining, based on the mapping relationship, the first storage object stored in the first storage space corresponding to the first operation.

According to the technical solutions provided in the embodiments of this disclosure, time slices are divided, so that a client, when accessing a storage object, can establish a snapshot to have read-only access to all object contents of the snapshot. A method for establishing a time slice-based snapshot. A snapshot is formed at each time point after a first snapshot is formed. No extra storage overheads are added, and a process of performing a snapshot operation does not affect existing services and reading/writing performance at all.

With reference to the first aspect, in some implementations of the first aspect, the operation record is divided into N time slices, and an operation record in each time slice includes time information of the time slice.

With reference to the first aspect and the foregoing implementations, in some implementations of the first aspect, the generating an operation record includes: generating new metadata based on time information of a time slice of the first operation and metadata corresponding to the first storage object.

With reference to the first aspect and the foregoing implementations, in some implementations of the first aspect, the object storage system (or referred as "the first storage") establishes a first snapshot in a first time slice, and when the object storage system receives a read request that is sent by a client and that is for the first snapshot, the method further includes: determining the first time slice based on a snapshot name of the first snapshot; and determining the metadata and the first storage object based on the first time slice.

With reference to the first aspect and the foregoing implementations, in some implementations of the first aspect, the object storage system establishes a first snapshot in a first time slice, and when the object storage system receives a rollback request that is sent by a client and that is for the first snapshot, the method further includes: determining a first time period based on a time slice in which the rollback request occurs and the first time slice; and deleting all operation records in the first time period.

It should be understood that the technical solutions provided in this disclosure are applicable to cloud storage. Because storage spaces of the cloud storage are large enough, when data in the cloud storage is very important, in a scenario in which deletions and changes are not particularly frequent, an entire bucket can be quickly rolled back to a given snapshot without affecting service capability of the cloud storage.

According to the foregoing technical solutions, when a client performs major service reconfiguration or has an important bucket, protection may be performed in a snapshot manner, and when an unexpected condition occurs, a bucket-level overall rollback may be performed, so as to achieve an objective of data protection.

According to a second aspect, a data query apparatus is provided, including: a generation unit, configured to generate a mapping relationship, where the mapping relationship is used to indicate a one-to-one correspondence between N operations and N storage spaces that are corresponding to a first storage (or referred as "an object storage system"), where the N operations occur at different moments, and a first storage space in the N storage spaces is used to store a first storage object on which processing based on a first operation has been performed, where the first operation is corresponding to the first storage space, and the first storage space is any one of the N storage spaces; the generation unit, further configured to generate an operation record, where the operation record is used to record the occurrence moments of the N operations; a receiving unit, configured to receive a first query request, where the first query request is used to request to query a storage status of the first storage object at a first moment; a determining unit, configured to determine, from the N operations based on the operation record, the first operation before the first moment; and the determining unit, further configured to determine, based on the mapping relationship, the first storage object stored in the storage space corresponding to the first operation.

With reference to the second aspect, in some implementations of the second aspect, the operation record is divided into N time slices, and an operation record in each time slice includes time information of the time slice.

With reference to the second aspect and the foregoing implementations, in some implementations of the second aspect, the generation unit is further configured to generate new metadata based on time information of a time slice of the first operation and metadata corresponding to the first storage object.

With reference to the second aspect and the foregoing implementations, in some implementations of the second aspect, the object storage system establishes a first snapshot in a first time slice, and when the first storage receives a read request that is sent by a client and that is for the first snapshot, the determining unit is further configured to: determine the first time slice based on a snapshot name of the first snapshot; and determine the metadata and the first storage object based on the first time slice.

With reference to the second aspect and the foregoing implementations, in some implementations of the second aspect, the object storage system establishes a first snapshot in a first time slice, and when the object storage system receives a rollback request that is sent by a client and that is for the first snapshot, the determining unit is further configured to: determine a first time period based on a time slice in which the rollback request occurs and the first time slice; and delete all operation records in the first time period.

According to a third aspect, a data query apparatus is provided, where the data query apparatus includes a processor and a communications interface, and the processor is configured to execute a program. When the processor executes code, the processor and the communications interface implement the data query method in any one of the first aspect or the possible implementations of the first aspect.

A memory may be integrated into the processor, or the processing apparatus may include the processor.

According to a fourth aspect, this disclosure provides a computer-readable storage medium. The computer readable storage medium stores program code that is used for a data query apparatus to execute. The program code includes instructions that are used to perform the data query method in any one of the first aspect or the possible implementations of the first aspect.

According to a fifth aspect, this disclosure provides a computer program product including one or more instructions. When the computer program product runs on a data query apparatus, the data query apparatus performs the data query method in any one of the first aspect or the possible implementations of the first aspect.

According to a sixth aspect, this disclosure provides a chip system, where the chip system includes a processor and a communications interface. The processor is configured to execute a program. When the processor executes the program, the processor and the communications interface implement the data query method in any one of the first aspect or the possible implementations of the first aspect.

Optionally, the chip may further includes a memory. Further, the memory and the processor may be integrated together.

DESCRIPTION OF EMBODIMENTS

The following describes technical solutions of this disclosure with reference to accompanying drawings.

Figure 1:
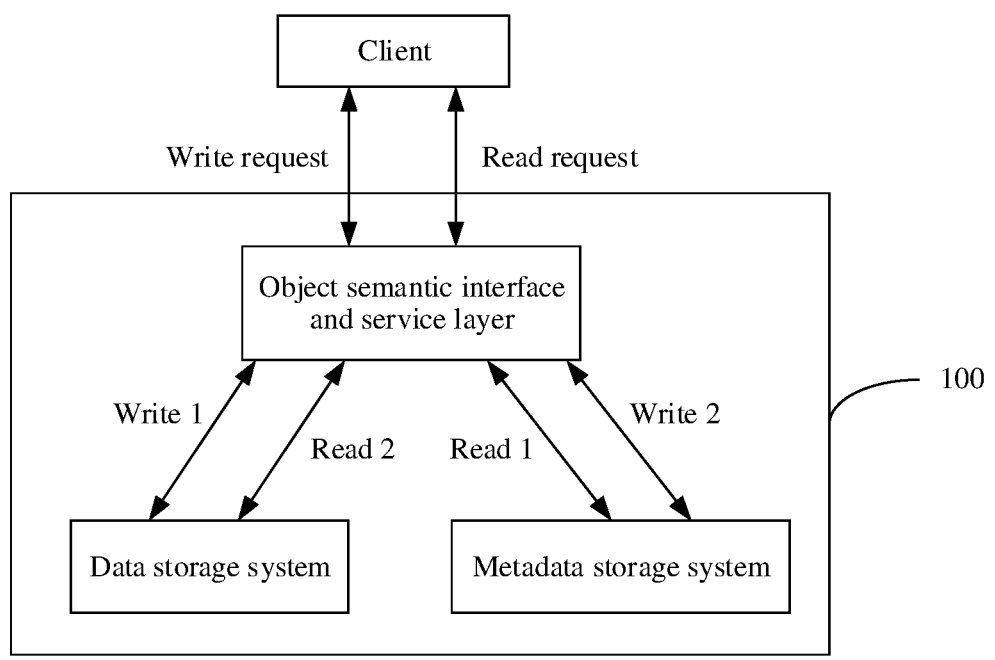
FIG. 1 is a schematic diagram of applying a data read/write process between an object storage system and a client according to an embodiment of this disclosure.

FIG. 1 is a schematic diagram of a data read/write process between an object storage system 100 and a client. As shown in FIG. 1, the object storage system 100 usually uses a manner of separating data from metadata. The object storage system 100 may include an object semantic interface and service layer, a metadata storage system, and a data storage system. The object semantic interface and service layer is connected to both the metadata storage system and the data storage system.

When a normal service runs between the client and the object storage system 100, for example, when the object storage system 100 performs a data write request process, a basic procedure of the data write request process is shown in FIG. 1, including the following: The object semantic interface and service layer receives a write request from the client; the object semantic interface and service layer delivers data to be written to the data storage system and obtains a unique data identifier or a data organization form, for example, a write 1 operation in FIG. 1; and the object semantic interface and service layer combines the obtained unique data identifier and another attribute of an object to metadata and writes the metadata to a metadata storage system, for example, a write 2 operation in FIG. 1, where the metadata storage system may uniquely index metadata of the object by using an object identifier.

When the object storage system 100 performs a data read request process, a basic process of the data read request process is shown in FIG. 1, including the following: The object semantic interface and service layer obtains the metadata of the object by indexing from the metadata storage system based on the object identifier and obtains a unique data identifier or a data organization form, for example, a read 1 operation in FIG. 1; and the object semantic interface and service layer obtains data by indexing from the data storage system based on the obtained unique data identifier, for example, a read 2 operation in FIG. 1, and returns another attribute of the metadata to the client.

With an increase of demand for storage applications, users need to perform data protection online, and a snapshot is one of effective online methods for preventing a data loss for a storage device. The snapshot is a fully usable copy of a specified data set. That is, the snapshot may be a copy of data represented by the snapshot or a duplicate of the data. Alternatively, it may be understood that the snapshot is a technology for protecting data of a file system, and is used to protect a status of the file system at a given time (for example, a time at which a data backup is started). In a specific implementation process, the snapshot is a reference mark or a pointer that points to data stored in the storage device. In addition, the snapshot can restore data online. When an application fault occurs on the storage device or a file is damaged, the data can be restored in time to a status at a point when the snapshot is generated. Alternatively, the snapshot may provide another data access channel for a storage user. When online application processing is performed, the users may access snapshot data, and may further perform work such as testing by using the snapshot.

The following briefly describes several snapshot technologies. According to the classification of snapshots by the Storage Networking Industry Association (SNIA), there are two types of snapshots, which are a full snapshot and an incremental snapshot that use different snapshot technologies. The full snapshot, also referred to as full replication or a full copy snapshot, uses a split mirror snapshot technology to first create and maintain a complete mirrored volume for a source data volume before a preset snapshot time point is reached. Each time when data is written, the data is written to both the source data volume and the mirrored volume. This ensures that two copies of a same piece of data are stored in the source data volume and the mirrored volume respectively, and the source data volume and the mirrored volume form a mirrored pair. When the preset snapshot time point is reached, a data write operation of the mirrored pair is stopped, and the mirrored volume quickly separates from the mirrored pair and converts to a snapshot volume. In this way, a data snapshot is obtained. After completing operations such as the data snapshot or the data backup, the snapshot volume and the source data volume are re-synchronized to form a new mirrored volume.

An advantage of the split mirror snapshot is good data isolation, making offline access to data possible. In addition, a process of restoring, replicating, or archiving all data on a hard disk is simplified. A most important thing is that a period of time for an operation is very short. A period of time, generally milliseconds, is the period of time required for only interrupting the mirrored pair, and such a small backup window does not affect upper-layer applications. The snapshot volume and the source data volume do not affect each other. However, this manner is not flexible and cannot establish a snapshot for any data volume at any time point. In addition, the split mirror snapshot requires one or more mirrored volumes with a same capacity as the source data volume. Therefore, a large quantity of storage spaces are occupied, two copies of data are written at the same time, and this greatly affects writing performance. In addition, overall performance of a storage system is reduced during mirror synchronization.

A characteristic of the incremental snapshot is that the incremental snapshot can track changes of both a data volume and a snapshot volume. When a new incremental snapshot is generated, old snapshot data is refreshed. A first snapshot and each piece of subsequently created incremental snapshot data have a timestamp. The snapshot data can be rolled back to any time point by using the timestamps. The incremental snapshot technology can accelerate the generation of the subsequent snapshots, and only a few more spaces are consumed. In this way, the snapshots can be created more frequently and retained longer. The incremental snapshots may include a copy-on-write (COW) snapshot and a redirect-on-write (ROW) snapshot.

A COW creates a data pointer table for each piece of source data to store physical pointers of all data in the source data. When a snapshot is created, a storage system copies a copy of the source data pointer table as a snapshot data pointer table. A snapshot volume is established by the COW only when the snapshot is created. The snapshot volume occupies only a comparatively small quantity of storage spaces that are used to store updated data in a source data volume after a snapshot time point. However, because after the snapshot is created, each write operation requires that raw data in the source data is first copied to the snapshot before the source data can start to be written, writing performance of the source data volume is reduced. Obviously, if a plurality of snapshots are created for a same piece of source data, the writing performance is lower. Therefore, the COW is not suitable for the writing performance requirement of storing massive data by object storage in a single bucket.

After a snapshot is created for the source data by using the ROW, and if an update operation is performed on the data of the source data, the raw data in the source data is not directly modified as that in the COW technology. Instead, a new space is created to store new data used to update the raw data. A snapshot data pointer table of the ROW stores a raw copy of the source data, and the data pointer table of the source data volume stores an updated copy. Therefore, before the snapshot volume is deleted, data to which a snapshot volume data pointer table points needs to be synchronized with the source data volume. In addition, after the plurality of snapshots are created, a snapshot chain is generated, so that access to the raw data, snapshot tracking and source data tracing, and deletion of the snapshot become extremely complex.

Currently, there is no any bucket-level snapshot, that is, there is no solution of bucket-level access to a given time point. A data replication technology of the object storage system can implement bucket-level replication. However, replication to another bucket is not up-to-date and no specific rollback method is available. The users need to restore data by themselves and can only roll back the data at the object level.

This disclosure provides a data query method, implements a bucket-level snapshot method of a time slice-based object storage system, and provides an implementation method that is suitable for an object to store features of massive data. Users can have read-only access to all object contents of a given snapshot and quickly roll back an entire bucket to a given snapshot without affecting service performance of the object storage system.

Figure 2:
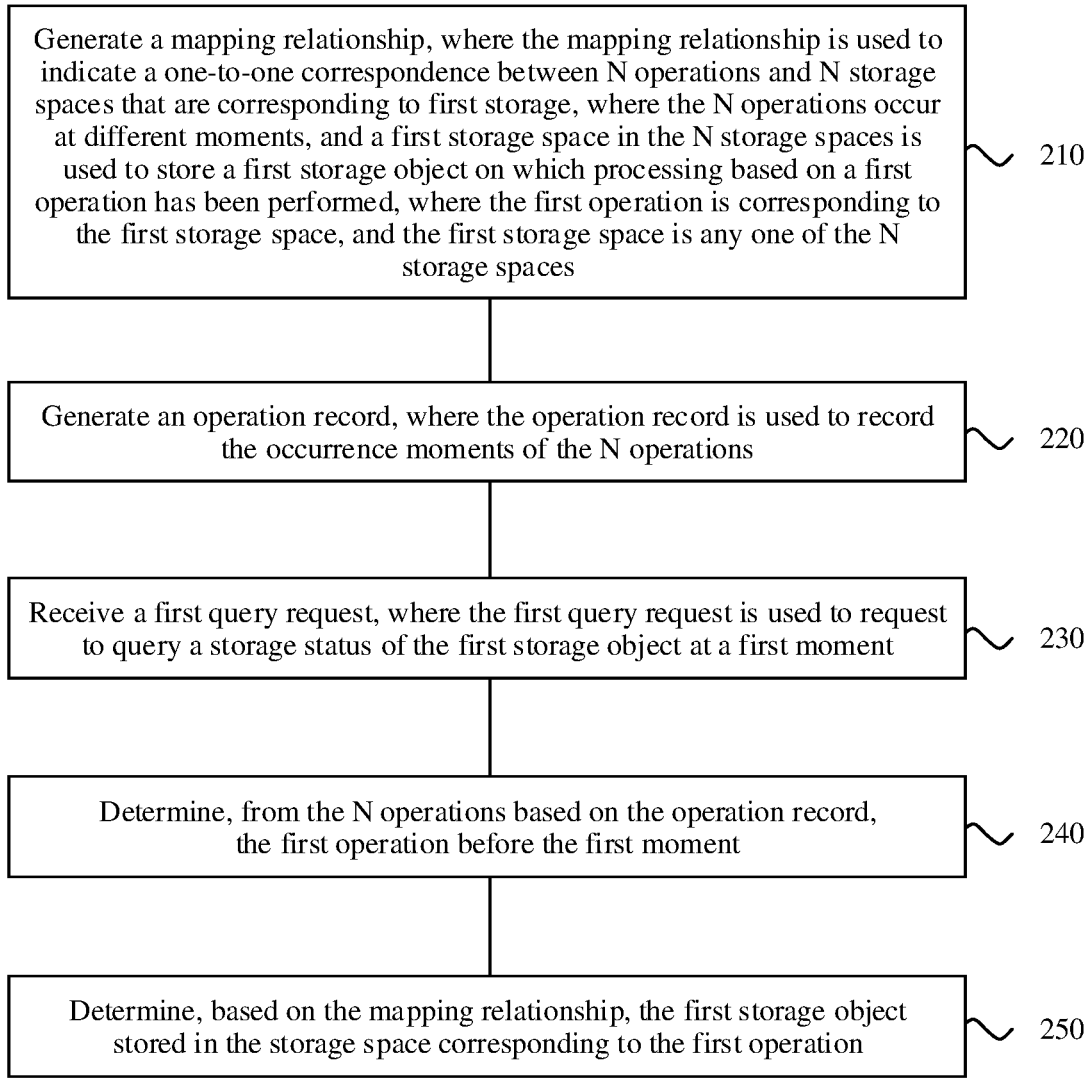
FIG. 2 is a flowchart of a data query method according to an embodiment of this disclosure.
Figure 3:
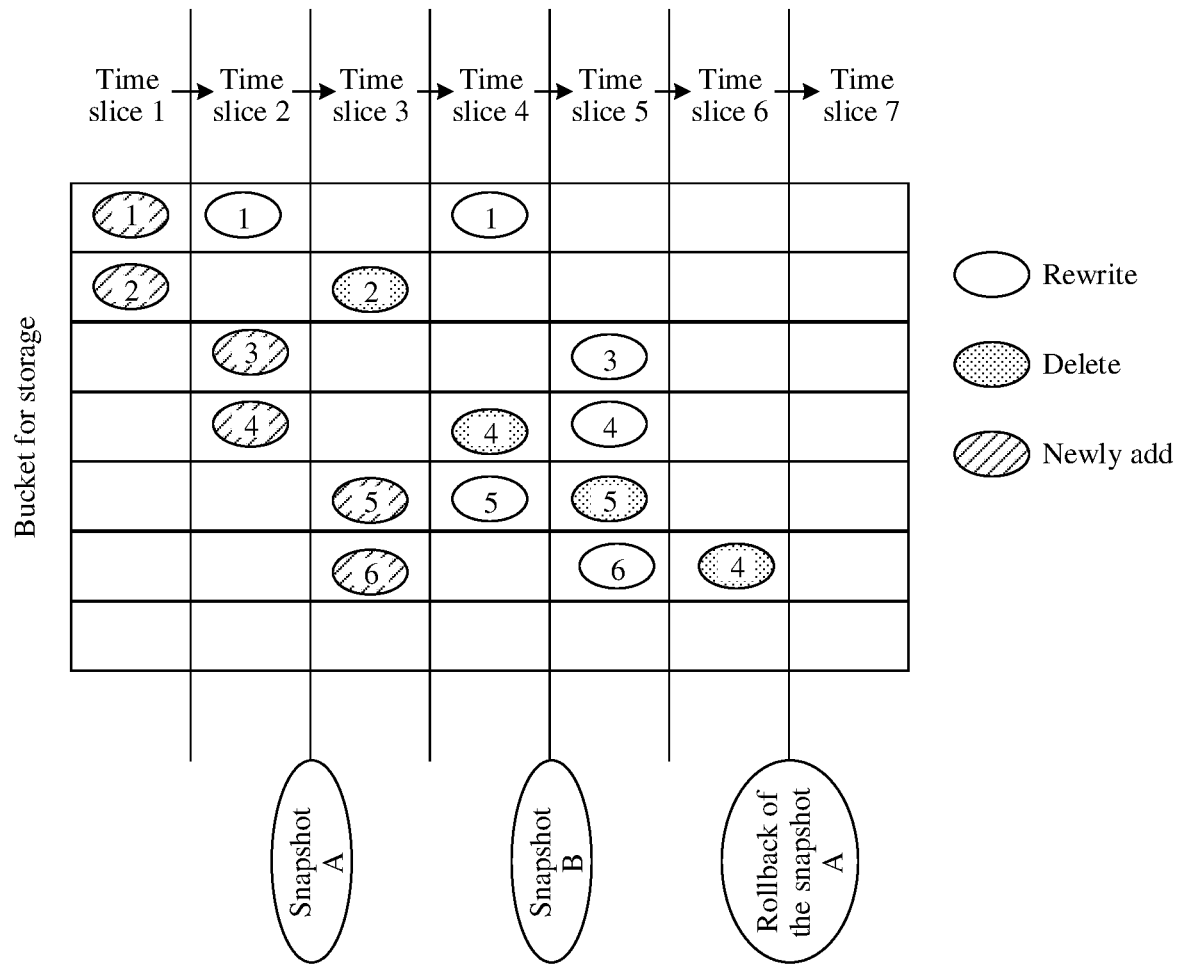
FIG. 3 is a schematic diagram of a bucket according to an embodiment of this disclosure.

FIG. 2 is a flowchart of a data query method 200 according to an embodiment of this disclosure. FIG. 3 is a schematic diagram of a bucket according to an embodiment of this disclosure. The following describes data query method provided in an embodiment of this disclosure in detail with reference to FIG. 2 and FIG. 3. As shown in FIG. 2, the method 200 includes the following steps:

Step 210: Generate a mapping relationship, where the mapping relationship is used to indicate a one-to-one correspondence between N operations and N storage spaces that are corresponding to a first storage (or referred as "an object storage system"), where the N operations occur at different moments, and a first storage space in the N storage spaces is used to store a first storage object on which processing based on a first operation has been performed, where the first operation is corresponding to the first storage space, and the first storage space is any one of the N storage spaces.

Step 220: Generate an operation record, where the operation record is used to record the occurrence moments of the N operations.

Step 230: Receive a first query request, where the first query request is used to request to query a storage status of the first storage object at a first moment.

Step 240: Determine, from the N operations based on the operation record, the first operation before the first moment.

Step 250: Determine, based on the mapping relationship, the first storage object stored in the storage space corresponding to the first operation.

Specifically, FIG. 3 is used as an example. The largest rectangular frame in FIG. 3 may be considered as a bucket. The bucket may be a container for storing one or more objects, and each object needs to belong to and only belongs to one bucket. In this disclosure, the bucket is referred to as a "first storage" or an "object storage system". As shown in FIG. 3, the object storage system may be divided into N storage spaces. The object storage system is divided based on a time slice, and may be divided into N storage spaces, where N is a positive integer. Management of the time slices herein may be maintained by using a dedicated module. It should be understood that the serial numbers of the time slices are monotonically increasing, for example, in FIG. 3, a time slice 1 to a time slice 7 are in an ascending order.

A storage object 1 is used as an example, and the storage object 1 is stored in a first storage space represented by the time slice 1. When a second storage space represented by a time slice 2 is reached, a rewrite operation is performed on the storage object 1. The mapping relationship in Step 210 may be understood as a correspondence between a storage space and an operation. For example, for the storage object 1, an operation corresponding to the first storage space is writing to the newly added storage object 1, and an operation corresponding to the second storage space is rewriting the storage object 1. The storage object 1 rewritten into the second storage space herein is a first storage object obtained after processing based on a rewrite operation. An operation record herein is "rewrite", that is, the storage object 1 is changed. The change in this disclosure is to only append, instead of actually overwriting, to a storage object.

Similarly, for a deletion operation, a storage object 2 is used as an example, and the storage object 2 is stored in the first storage space represented by the time slice 1. When the second storage space represented by the time slice 2 is reached, no operation is performed on the storage object 2, and when a third storage space represented by a time slice 3 is reached, the deletion operation is performed on the storage object 2. However, this only marks a deletion behavior for the storage object 2, and does not actually delete the storage object 2.

When a snapshot A is generated at a moment represented by the time slice 2, because the deletion operation is performed on the storage object 2 in the time slice 3, the storage object 2 cannot be accessed after the time slice 2. However, because the deletion behavior is not actually deleting the storage object 2, users may access the storage object 2 by accessing the snapshot A.

Optionally, the operation record is divided into N time slices, and an operation record in each time slice includes time information of the time slice. New metadata is generated based on time information of a time slice of the first operation and metadata corresponding to the first storage object.

After a given time slice is determined as a snapshot, all operations on a storage object and a bucket do not delete or overwrite original data and metadata. Instead, new original data is generated based on an internal version number of the time slice, and the bucket is accessed based on a latest time slice and a version number. It should be understood that the access operation is controlled to be initiated or terminated by a client sending an access request, and the object storage system cannot initiate the access operation by itself.

The foregoing describes in the object storage system, the storage object needs to be accessed by using the mapping relationship between metadata and a storage object. In the embodiments of this disclosure, because a concept of a time slice is added to the object storage system, for all operations on the object and the bucket, time slice information of the current operation may be appended to metadata of the storage object for recording, so as to improve searching and listing of the metadata for the time slice, and a metadata system needs to add an index for the time slice. Therefore, in the access process of the storage object, the metadata of the storage object may be queried based on the index of the time slice, and then the storage object is accessed based on the metadata of the storage object.

Optionally, the object storage system establishes a first snapshot in a first time slice, and when the object storage system receives a read request that is sent by a client and that is for the first snapshot, the object storage system may determine the first time slice based on a snapshot name of the first snapshot, and determine the metadata and the first storage object based on the first time slice.

When the client sends the access request and decides to access data of a given snapshot, the object storage system first finds a corresponding time slice based on a snapshot name, and then finds corresponding metadata and data based on the time slice for access.

In another possible implementation, the object storage system establishes a first snapshot in a first time slice, and when the object storage system receives a rollback request that is sent by a client and that is for the first snapshot, the method further includes: determining a first time period based on a time slice in which the rollback request occurs and the first time slice; and deleting all operation records in the first time period.

When the client sends the access request and decides to roll back to data of a given snapshot, a back-end of the system actually deletes all changes made between the time slice of the rollback and the time slice of the snapshot, while all change records between these two time slices are ignored during front-end access.

Specifically, the bucket in FIG. 3 is used as an example. A snapshot A is generated in the second storage space corresponding to the time slice 2. When a rollback of the snapshot A is generated in a sixth storage space corresponding to a time slice 6, all operations between the time slice 2 and the time slice 6 are deleted, that is to roll back to a storage status of the time slice 2.

It should be understood that the technical solutions provided in this disclosure are applicable to cloud storage. Because storage spaces of the cloud storage are large enough, when data in the cloud storage is very important, in a scenario in which deletions and changes are not particularly frequent, an entire bucket can be quickly rolled back to a given snapshot without affecting service capability of the cloud storage.

According to the technical solutions provided in the embodiments of this disclosure, by time slice dividing, when accessing a storage object, the client can have read-only access to all object contents of a snapshot in a manner of establishing the snapshot. A method for establishing a time slice-based snapshot. A snapshot is formed at each time point after a first snapshot is formed. No extra storage overheads are added, and a process of performing a snapshot operation does not affect existing services and reading/writing performance at all. In addition, when the client performs major service reconfiguration or has an important bucket, protection may be performed in a snapshot manner, and when an unexpected condition occurs, a bucket-level overall rollback may be performed, so as to achieve an objective of data protection.

The foregoing describes the data query method in the embodiments of this disclosure in detail with reference to FIG. 1 to FIG. 3. The following describes a data query apparatus in the embodiments of this disclosure in detail with reference to FIG. 4 to FIG. 5.

Figure 4:
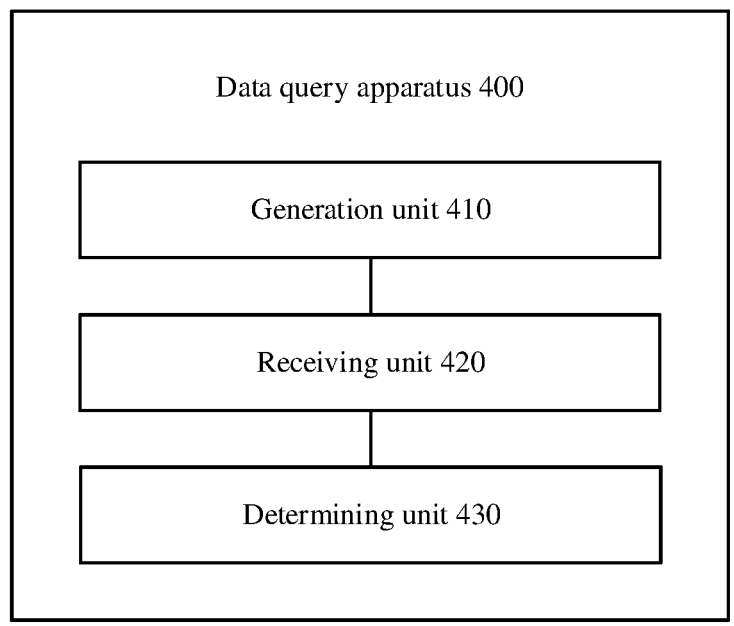
FIG. 4 is a schematic block diagram of a data query apparatus according to an embodiment of this disclosure.

FIG. 4 is a schematic block diagram of a data query apparatus 400 according to an embodiment of this disclosure. The apparatus 400 may be corresponding to the object storage system described in the foregoing method 200, or may be a chip or a component applied to the object storage system. In addition, all modules or units in the apparatus 400 are separately configured to perform all actions or processing processes performed by the object storage system in the foregoing method 200. As shown in FIG. 4, the apparatus 400 may include a generation unit 410, a receiving unit 420, and a determining unit 430.

The generation unit 410 is configured to generate a mapping relationship. The mapping relationship is used to indicate a one-to-one correspondence between N operations and N storage spaces that are corresponding to a first storage (or referred as "an object storage system"). The N operations occur at different moments, and a first storage space in the N storage spaces is used to store a first storage object on which processing based on a first operation has been performed. The first operation is corresponding to the first storage space, and the first storage space is any one of the N storage spaces.

The generation unit 410 is further configured to generate an operation record, where the operation record is used to record the occurrence moments of the N operations.

The receiving unit 420 is configured to receive a first query request, where the first query request is used to request to query a storage status of the first storage object at a first moment.

The determining unit 430 is configured to determine, from the N operations based on the operation record, the first operation before the first moment.

The determining unit 430 is further configured to determine, based on the mapping relationship, the first storage object stored in the storage space corresponding to the first operation.

Optionally, the operation record is divided into N time slices, and an operation record in each time slice includes time information of the time slice.

Optionally, the generation unit 410 is further configured to generate new metadata based on time information of a time slice of the first operation and metadata corresponding to the first storage object.

In a possible implementation, the object storage system establishes a first snapshot in a first time slice, and when the object storage system receives a read request that is sent by a client and that is for the first snapshot, the determining unit 430 is further configured to: determine the first time slice based on a snapshot name of the first snapshot; and determine the metadata and the first storage object based on the first time slice.

In another possible implementation, the object storage system establishes a first snapshot in a first time slice, and when the object storage system receives a rollback request that is sent by a client and that is for the first snapshot, the determining unit is further configured to: determine a first time period based on a time slice in which the rollback request occurs and the first time slice; and delete all operation records in the first time period.

Figure 5:
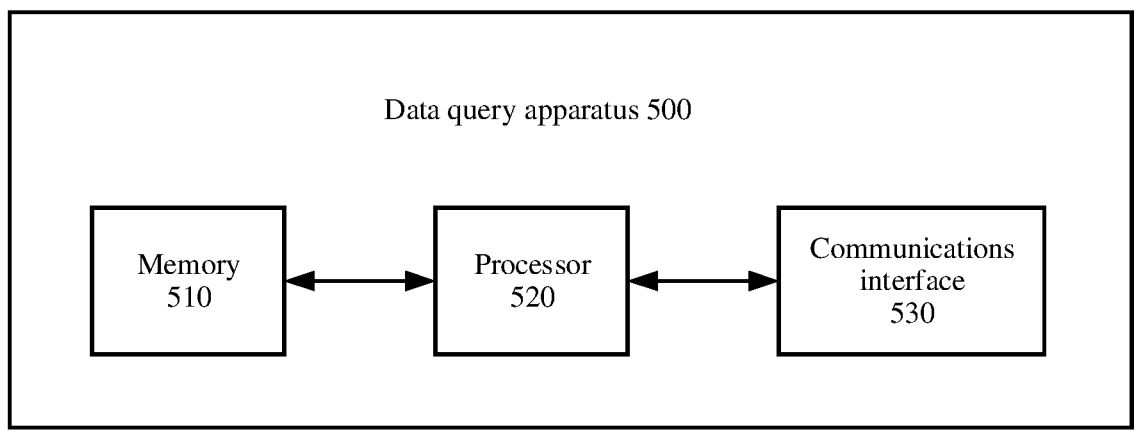
FIG. 5 is a schematic structural diagram of a data query apparatus according to another embodiment of this disclosure.

FIG. 5 is a schematic structural diagram of a data query apparatus according to another embodiment of this disclosure. It should be understood that an apparatus 500 shown in FIG. 5 is merely an example. The data query apparatus in this embodiment of this disclosure may further include another module or unit, or include modules having functions similar to those of the modules in FIG. 5, or does not necessarily need to include all the modules in FIG. 5.

A memory 510 stores program code used to implement functions of all the modules shown in FIG. 2.

A processor 520 is configured to execute the program code stored in the memory 510.

A communications interface 530 is configured to: communicate with a storage device or a storage medium, read data in the storage device or the storage medium, or write data to the storage device or the storage medium.

Specifically, when the processor executes the program code stored in the memory 510, the processor 520 may invoke the communications interface 530 to implement the data query method in FIG. 2.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this disclosure.

It may be clearly understood by a person skilled in the art that, for a purpose of convenient and brief description, for a detailed working process of the foregoing system, apparatus, and unit, refer to a corresponding process in the foregoing method embodiments, and details are not described herein again.

In the several embodiments provided in this disclosure, it should be understood that the disclosed system, apparatus, and method may be implemented in other manners. For example, the described apparatus embodiment is merely an example. For example, the unit division is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this disclosure may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this disclosure essentially, or the part contributing to a prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this disclosure. The foregoing storage medium includes any medium that can store program code, such as a USB flash drive, a removable hard disk, a read-only memory (ROM), a random access memory (RAM), a magnetic disk, or a compact disc.

The foregoing descriptions are merely specific implementations of this disclosure, but are not intended to limit the protection scope of this disclosure. Any variation or replacement readily figured out by a person skilled in the art within the technical scope disclosed in this disclosure shall fall within the protection scope of this disclosure. Therefore, the protection scope of this disclosure shall be subject to the protection scope of the claims.

What is claimed is:

1. A data query method, comprising:
generating a mapping relationship, wherein the mapping relationship indicates a one-to-one correspondence between a plurality of operations and a plurality of storage spaces in a storage system, wherein the plurality of operations occur at different occurrence moments, and a first storage space in the plurality of storage spaces stores a first storage object on which processing based on a first operation has been performed, wherein the first operation is corresponding to the first storage space, and the first storage space is one of the plurality of storage spaces;
generating operation records recording the occurrence moments of the plurality of operations, wherein each of the operation records records the occurrence moment of one of the plurality of operations;
receiving a first query request, wherein the first query request requests to query a storage status of the first storage object at a first moment;
determining, from the plurality of operations based on the operation records, the first operation before the first moment; and
determining, based on the mapping relationship, the first storage object stored in the first storage space corresponding to the first operation.

2. The method according to claim 1, wherein the operation records are categorized into a plurality of time slices, each of the plurality of operations is associated with one of the plurality of time slices in accordance with the occurrence moment of the operation, and an operation record in each time slice comprises time information of the time slice.

3. The method according to claim 2, wherein the generating operation records comprises:
generating new metadata based on time information of a time slot associated with the first operation and metadata corresponding to the first storage object.

4. The method according to claim 3, wherein the storage system establishes a first snapshot in a first time slice and the first time slice is the time slice associated with the first operation, and the method further comprises:
determining the first time slice based on a snapshot name of the first snapshot and determining the metadata and the first storage object based on the first time slice, when the storage system receives a read request for the first snapshot from a client.

5. The method according to claim 1, wherein the storage system establishes a first snapshot in a first time slice, and the method further comprises:
determining a first time period based on a time slice in which a rollback request for the first snapshot occurs and the first time slice, when the storage system receives the rollback request from a client; and deleting all operation records in the first time period from the operation records.

6. The method according to claim 1, wherein, when the first operation is a modify operation, the processing based on the first operation comprises appending to the first storage object stored in one of the plurality of storage spaces at a preceding moment without overwriting the first storage object stored in one of the plurality of storage spaces at the preceding moment.

7. The method according to claim 6, wherein, when the first operation is a delete operation, the processing based on the first operation comprises marking as deleted the first storage object stored in one of the plurality of storage spaces at a preceding moment without deleting the first storage object stored in one of the plurality of storage spaces at the preceding moment.

8. A data query apparatus, comprising:
a communication interface; and
a processor coupled to the communication interface and configured to:
generate a mapping relationship, wherein the mapping relationship indicates a one-to-one correspondence between a plurality of operations and a plurality of storage spaces that are corresponding to a storage system, wherein the plurality of operations occur at different occurrence moments, and a first storage space in the plurality of storage spaces stores a first storage object on which processing based on a first operation has been performed, wherein the first operation is corresponding to the first storage space, and the first storage space is one of the plurality of storage spaces;
generate operation records recording the occurrence moments of the plurality of operations, wherein each of the operation records records the occurrence moment of one of the plurality of operations;
receive a first query request, wherein the first query request requests to query a storage status of the first storage object at a first moment;
determine, from the plurality of operations based on the operation records, the first operation before the first moment; and
determine, based on the mapping relationship, the first storage object stored in the first storage space corresponding to the first operation.

9. The apparatus according to claim 8, wherein the operation records are categorized into a plurality of time slices, each of the plurality of operations is associated with one of the plurality of time slices in accordance with the occurrence moment of the operation, and an operation record in each time slice comprises time information of the time slice.

10. The apparatus according to claim 9, wherein processor is further configured to:
generate new metadata based on time information of a time slice associated with the first operation and metadata corresponding to the first storage object.

11. The apparatus according to claim 10, wherein the storage system establishes a first snapshot in a first time slice and the first time slice is the time slice associated with the first operation, and the processor is further configured to:
determine the first time slice based on a snapshot name of the first snapshot and determine the metadata and the first storage object based on the first time slice, when the storage system receives a read request for the first snapshot from a client.

12. The apparatus according to claim 8, wherein the storage system establishes a first snapshot in a first time slice, the processor is further configured to:
determine a first time period based on a time slice in which a rollback request for the first snapshot occurs and the first time slice, when the storage system receives the rollback request from a client; and
delete all operation records in the first time period from the operation records.

13. A non-transitory computer-readable medium, wherein the non-transitory computer-readable medium stores a computer program, the program comprising instructions, that when executed by a computer, enable the computer to perform steps comprising:
generating a mapping relationship, wherein the mapping relationship indicates a one-to-one correspondence between a plurality of operations and a plurality of storage spaces that are corresponding to a storage system, wherein the plurality of operations occur at different occurrence moments, and a first storage space in the plurality of storage spaces is stores a first storage object on which processing based on a first operation has been performed, wherein the first operation is corresponding to the first storage space, and the first storage space is one of the plurality of storage spaces;
generating operation records recording the occurrence moments of the plurality of operations, wherein each of the operation records records the occurrence moment of one of the plurality of operations;
receiving a first query request, wherein the first query request requests to query a storage status of the first storage object at a first moment;
determining, from the plurality of operations based on the operation records, the first operation before the first moment; and
determining, based on the mapping relationship, the first storage object stored in the first storage space corresponding to the first operation.

14. The non-transitory computer-readable medium according to claim 13, wherein the operation records are categorized into a plurality of time slices, each of the plurality of operations is associated with one of the plurality of time slices in accordance with the occurrence moment of the operation, and an operation record in each time slice comprises time information of the time slice.

15. The non-transitory computer-readable medium according to claim 14, wherein the computer is enabled to further perform steps comprising:
generating new metadata based on time information of a time slice associated with the first operation and metadata corresponding to the first storage object.

16. The non-transitory computer-readable medium according to claim 15, wherein the storage system establishes a first snapshot in a first time slice and the first time slice is the time slice associated with the first operation, and the computer is enabled to further perform steps comprising:
determining the first time slice based on a snapshot name of the first snapshot and determining the metadata and the first storage object based on the first time slice, when the storage system receives a read request for the first snapshot from a client.

17. The non-transitory computer-readable medium according to claim 13, wherein the storage system establishes a first snapshot in a first time slice, the computer is enabled to further perform steps comprising:
determining a first time period based on a time slice in which a rollback request for the first snapshot occurs and the first time slice, when the storage system receives the rollback request from a client; and
deleting all operation records in the first time period from the operation records.

* * * * *